(12) United States Patent
Baxter et al.

(10) Patent No.: US 10,724,891 B2
(45) Date of Patent: Jul. 28, 2020

(54) APPARATUS AND METHOD FOR MEASURING LEVEL

(71) Applicants: Larry Baxter, Orem, UT (US); Eric Mansfield, Spanish Fork, UT (US); Aaron Sayre, Spanish Fork, UT (US); David Frankman, Provo, UT (US)

(72) Inventors: Larry Baxter, Orem, UT (US); Eric Mansfield, Spanish Fork, UT (US); Aaron Sayre, Spanish Fork, UT (US); David Frankman, Provo, UT (US)

(73) Assignee: Hall Labs LLC, Provo, UT (US)

( * ) Notice: Subject to any disclaimer, the term of this patent is extended or adjusted under 35 U.S.C. 154(b) by 200 days.

(21) Appl. No.: 15/955,100

(22) Filed: Apr. 17, 2018

(65) Prior Publication Data

US 2019/0316950 A1   Oct. 17, 2019

(51) Int. Cl.
*G01F 23/18* (2006.01)
*G01F 25/00* (2006.01)
*G01F 23/16* (2006.01)
*G01F 23/14* (2006.01)

(52) U.S. Cl.
CPC .............. *G01F 23/18* (2013.01); *G01F 23/14* (2013.01); *G01F 23/16* (2013.01); *G01F 23/164* (2013.01); *G01F 25/0061* (2013.01)

(58) Field of Classification Search
CPC ........ G01F 23/18; G01F 23/164; G01F 23/16; G01F 23/14
See application file for complete search history.

(56) References Cited

U.S. PATENT DOCUMENTS 5,146,783 A * 9/1992 Jansche ................. G01F 23/168
73/301

* cited by examiner

*Primary Examiner* — Paul M. West

(57) ABSTRACT

A vessel with a cavity for measuring level is disclosed. The vessel includes a differential pressure sensor having a first port and a second port, a reference tube that connects the first port of the differential pressure sensor to a bottom portion of the cavity, and an impulse tube that connects the second port of the differential pressure sensor to an impulse tube ending. At least a portion of the impulse tube extends through the cavity and ends at a fluid inlet. The fluid inlet is located at a level above the reference tube.

18 Claims, 6 Drawing Sheets

APPARATUS AND METHOD FOR MEASURING LEVEL

GOVERNMENT INTEREST STATEMENT

This invention was made with government support under DE-FE0028697 awarded by the Department of Energy. The government has certain rights in the invention.

TECHNICAL FIELD

The devices, systems, and methods described herein relate generally to level detection. More particularly, the devices, systems, and methods described herein relate to determining level by differential pressure.

BACKGROUND

Determining level in fluids is required in most industries. Level instruments include devices such as floats, ultrasonic transmitters, radar transmitters, nuclear detectors, and differential pressure transmitters. Often, differential pressure transmitters are external to the vessel in which the fluid level is being measured. Differential pressure transmitters measure level by determining the pressure of the fluid in a vessel for at least two levels and using the difference to determine how much liquid is in the vessel. Measurements where the fluids are at extremes of temperatures can be problematic due to temperature differences between the fluid in the vessel and any fluids in the differential pressure transmitters.

SUMMARY

In a first aspect, the apparatus includes a vessel with a cavity. The vessel includes a differential pressure sensor having a first port and a second port, a reference tube that connects the first port of the differential pressure sensor to a bottom portion of the cavity, and an impulse tube that connects the second port of the differential pressure sensor to an impulse tube ending. At least a portion of the impulse tube extends through the cavity and ends at a fluid inlet. The fluid inlet is located at a level above the reference tube.

In a second aspect, a method for measuring level includes the step of passing a process fluid into a vessel. A portion of the process fluid fills a fluid inlet of an impulse tube of a differential pressure sensor. The differential pressure sensor includes a reference tube. The reference tube connects the differential pressure sensor to a bottom portion of the vessel. The impulse tube passes from the differential pressure sensor into the vessel and ends at the fluid inlet. The pressure difference created by the portion of the process fluid that passes into the fluid inlet compared to a pressure of the reference tube is measured.

The level may be between the reference tube and a full height of the vessel.

The impulse tube ending may be a fluid inlet. The vessel may include a vessel inlet. The vessel inlet may be situated such that at least a portion of a process fluid entering the vessel may pass into the fluid inlet of the impulse tube, filling the impulse tube with the process fluid.

The differential pressure sensor may detect a pressure difference when the process fluid is added to the fluid inlet. The pressure difference may indicate a level of the process fluid in the vessel.

The vessel may include a retractable cover covering the fluid inlet. The retractable cover may have an open state and a closed state. The retractable cover may cover the fluid inlet in the closed state and may allow the process fluid to pass into the fluid inlet in the open state.

The process fluid may be a cryogenic fluid, a supercritical fluid, or a combination thereof.

The fluid inlet may be a funnel.

The impulse tube may include a hinged area, allowing the impulse tube to be moved such that a process fluid entering the vessel does not pass into the fluid inlet. The impulse tube ending may be closed and the impulse tube may be filled with a reference fluid of the same density as a process fluid in the vessel.

The connection of the reference tube to the vessel may be a diaphragm and the reference tube may be filled with a reference fluid of a same density as a process fluid in the vessel.

The vessel may include one or more temperature sensors attached to the impulse tube, the reference tube, or a combination thereof.

The differential pressure sensor may be at least partially enclosed within the vessel.

The differential pressure sensor may include a wireless communication apparatus.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
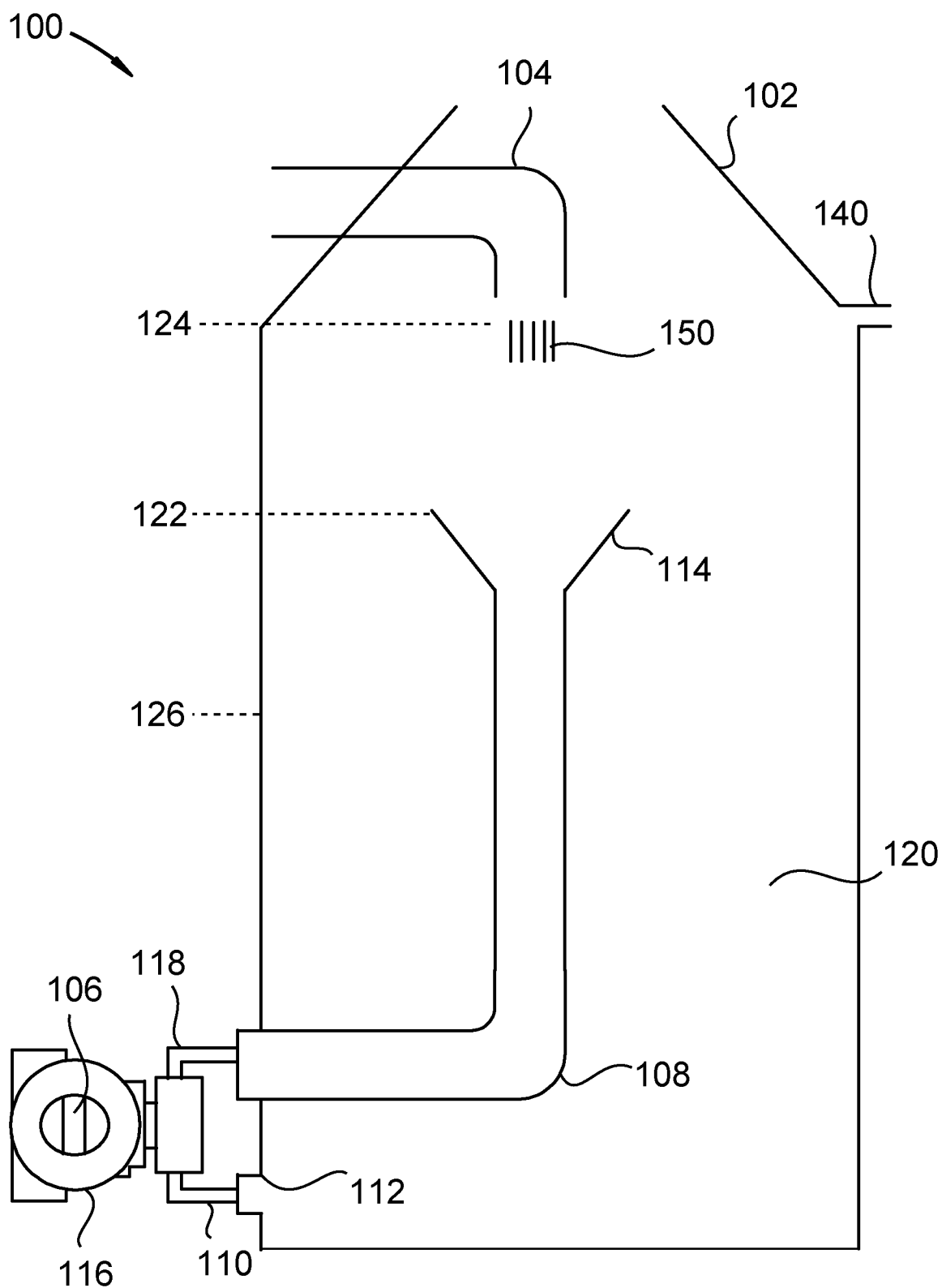
FIG. 1 is a cross-sectional elevation view of a vessel with a differential pressure transmitter.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "transmitter" is meant to refer to transducers, instruments, sensors, measurement devices, or similar devices used for measuring level.

As used herein, "tube" is meant to refer to pipes and hoses.

As used herein, "cryogenic" is intended to refer to temperatures below about −58° F. (−50° C.).

As used herein, "process fluid" is intended to refer to any of a variety of fluids used in a processing facility. This may be a pure (single compound) liquid, a mixed (multi-component) liquid, a slurry (a liquid with solids entrained), a liquid with entrained gas bubbles, a liquid with dissolved components, or a mixture of liquids.

Measuring level, especially in cases of cryogenic liquids, can be cumbersome if the cryogenic conditions cause deposition on instrumentation at the interface of the walls of the containing vessel. A traditional differential pressure transmitter includes two ports that connect at two different locations on the exterior wall of a vessel. However, this means that the temperature of the fluid in the top (impulse) port, connected by an impulse tube, is at a different temperature than the fluid inside the vessel. This temperature difference can cause deviations in accuracy. This can be especially detrimental when the fluid density varies significantly with temperature. In the present invention, this is overcome by having the end of the impulse tube inside of the vessel such that the temperature of the fluid in the impulse tube remains substantially the same as the temperature of the fluid in the vessel. In a preferred embodiment, "substantially" the same temperature refers to temperatures within 10° C. of each other. In a more preferred embodiment, this refers to temperatures within 2° C. of each other.

The present invention is also especially useful when the fluid rains down into the vessel, keeping the fluid isothermal, and when it rains down in a way that keeps the impulse tube consistently full, maintaining a consistent static pressure in the impulse tube.

Now referring to FIG. 1, FIG. 1 is a cross-sectional elevation view 100 of a vessel with a differential pressure transmitter that may be used in the devices, methods, and systems disclosed herein. Vessel 102 includes a cavity 120, an inlet pipe 104, a differential pressure transmitter (DPT) 106, a reference tube inlet port 112, and an overflow outlet 140. DPT 106 includes an impulse port 118, a reference port 116, an impulse tube 108, an impulse tube ending funnel 114, and a reference tube 110. The fluid level 126 is below the maximum measurable level 122 at the top of the impulse tube ending funnel 114. The vessel maximum fill level 124 is at the overflow outlet 140.

A process fluid 150 is passed into vessel 102 through inlet pipe 104. Impulse tube 108 is filled and the process fluid 150 overflows and fills vessel 102. The pressure difference between the reference tube 110 and the impulse tube 108 determines the fluid level 126.

Figure 2:
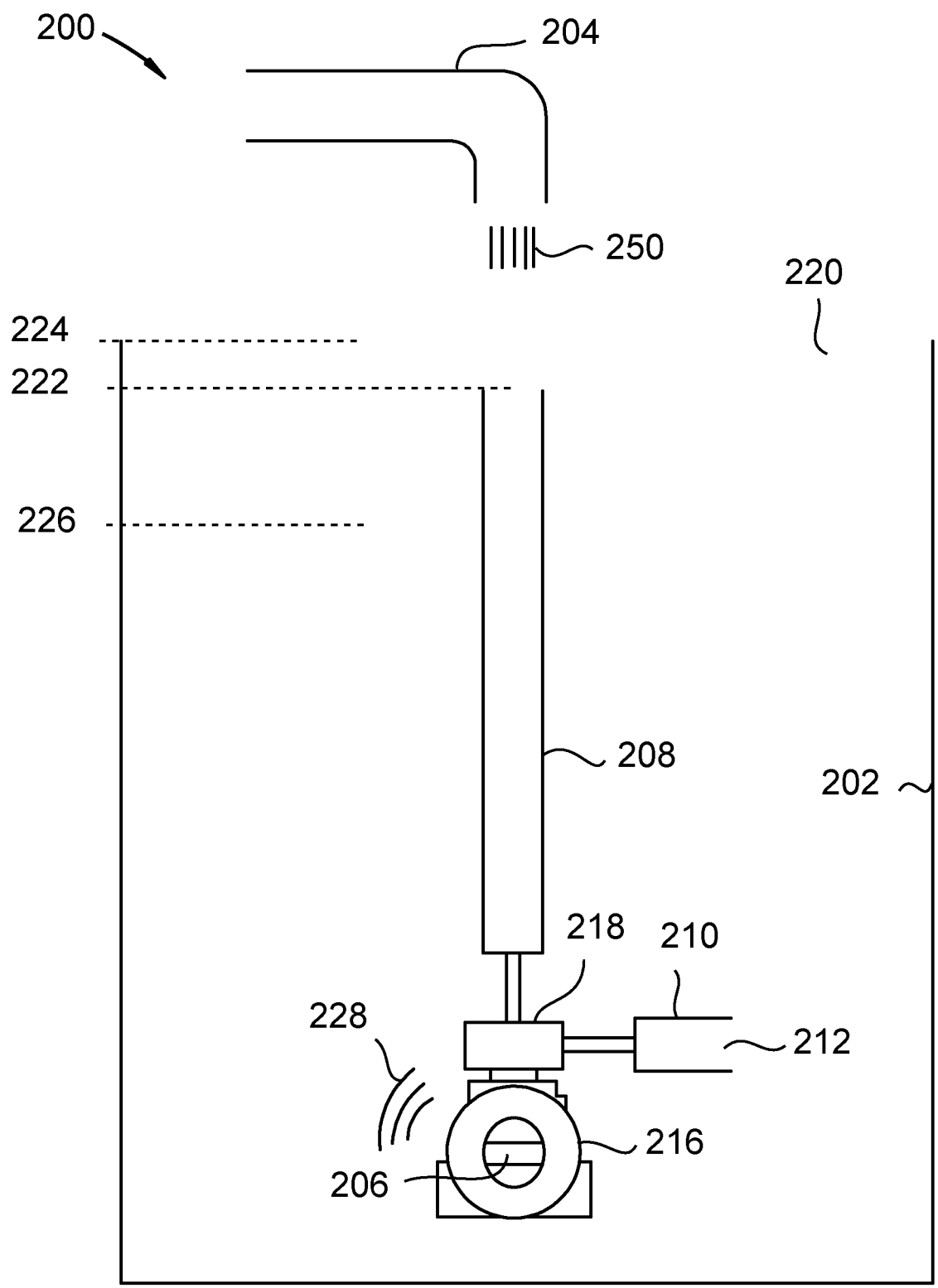
FIG. 2 is a cross-sectional elevation view of a vessel with a differential pressure transmitter.

FIG. 2 is a cross-sectional elevation view 200 of a vessel with a differential pressure transmitter that may be used in the devices, methods, and systems disclosed herein. Vessel 202 includes a cavity 220, an inlet pipe 204, a differential pressure transmitter (DPT) 206, a reference tube inlet 212, and an overflow outlet 240. DPT 206, entirely inside the cavity, includes an impulse port 218, a reference port 216, an impulse tube 208, an impulse tube ending 214, and a reference tube 210. The fluid level 226 is below the maximum measurable level 222 at the top of the impulse tube ending 214. The maximum level 224 is at the top of vessel 202.

A process fluid 250 is passed into vessel 202 through inlet pipe 204. Impulse tube 208 is filled and the process fluid 250 overflows and fills vessel 202. The pressure difference between the reference tube 210 and the impulse tube 208 determines the fluid level 226. DPT 206 transmits data wirelessly 228 to a receiver.

Figure 3:
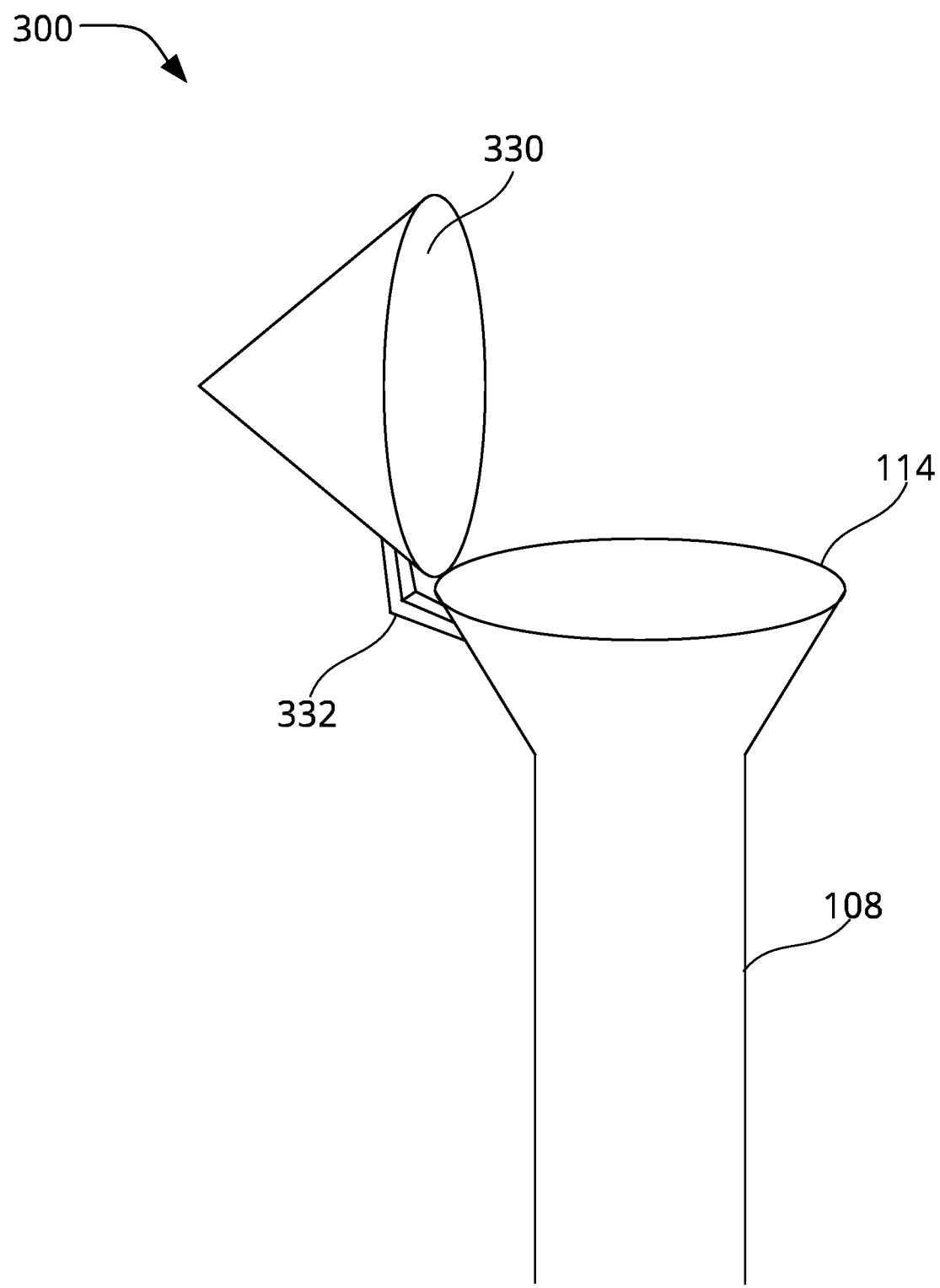
FIG. 3 is an isometric front top view of an impulse tube with a cap.

FIG. 3 is an isometric front top view 300 of an impulse tube, as in FIG. 1, with a cap. The impulse tube 108 ends in impulse tube ending funnel 114. A cap 330 with a hinge 332 is mounted on the impulse tube ending funnel 114. The hinge 332 may be actuated to open or close cap 330. The actuator is not shown for clarity. By closing cap 330, fluid 150 is diverted from entering the impulse tube 108. By closing cap 330 after the impulse tube 108 is filled, the maximum measurable height becomes the vessel maximum fill level 124. For this maximum measurable height, the cap 330 and the funnel 114 need to seal so no fluid 150 is in communication between the impulse tube 108 and the cavity 120.

Figure 4:
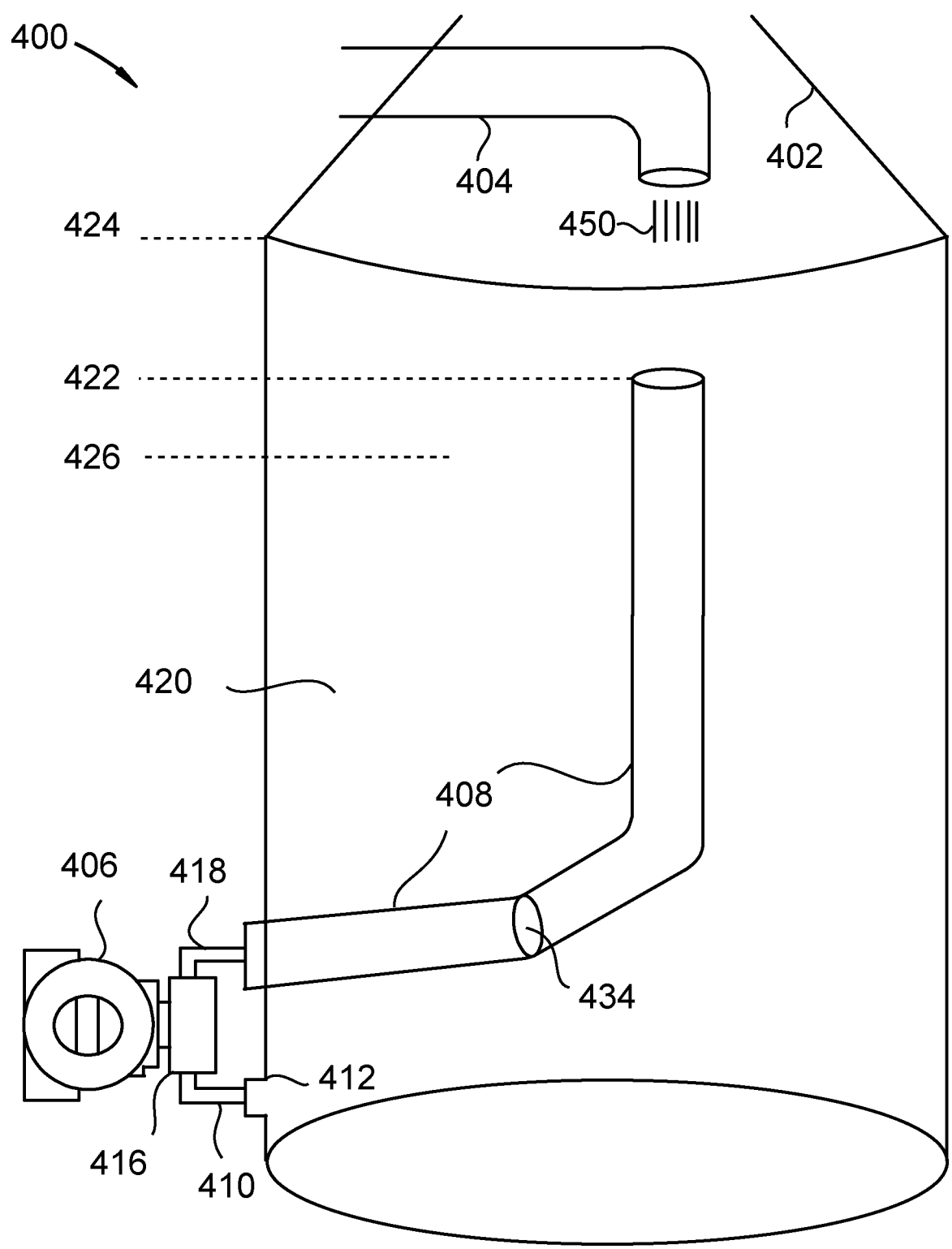
FIG. 4 is an isometric front elevation view of a vessel with a differential pressure transmitter, with non-opaque vessel walls.

FIG. 4 is an isometric front elevation view 400 of a vessel with a differential pressure transmitter, with non-opaque vessel walls, that may be used in the devices, methods, and systems disclosed herein. Vessel 402 includes a cavity 420, an inlet pipe 404, a differential pressure transmitter (DPT) 406, a reference tube inlet port 412, and an overflow outlet 440. DPT 406 includes an impulse port 418, a reference port 416, an impulse tube 408, and a reference tube 410. The fluid level 426 is below the maximum measurable level 422 at the top of the impulse tube ending funnel 414. The vessel maximum fill level 424 is at the overflow outlet 440. The impulse tube 408 has a hinged point 434 that moves the end of the impulse tube 408 into the path of fluid 450 and back out.

A process fluid 450 is passed into vessel 402 through inlet pipe 404. Impulse tube 408 is filled and the process fluid 450 overflows and fills vessel 402. At that point, the hinged point actuates and moves the impulse tube ending out of the path of fluid 450. The pressure difference between the reference tube 410 and the impulse tube 408 determines the fluid level 426.

Figure 5:
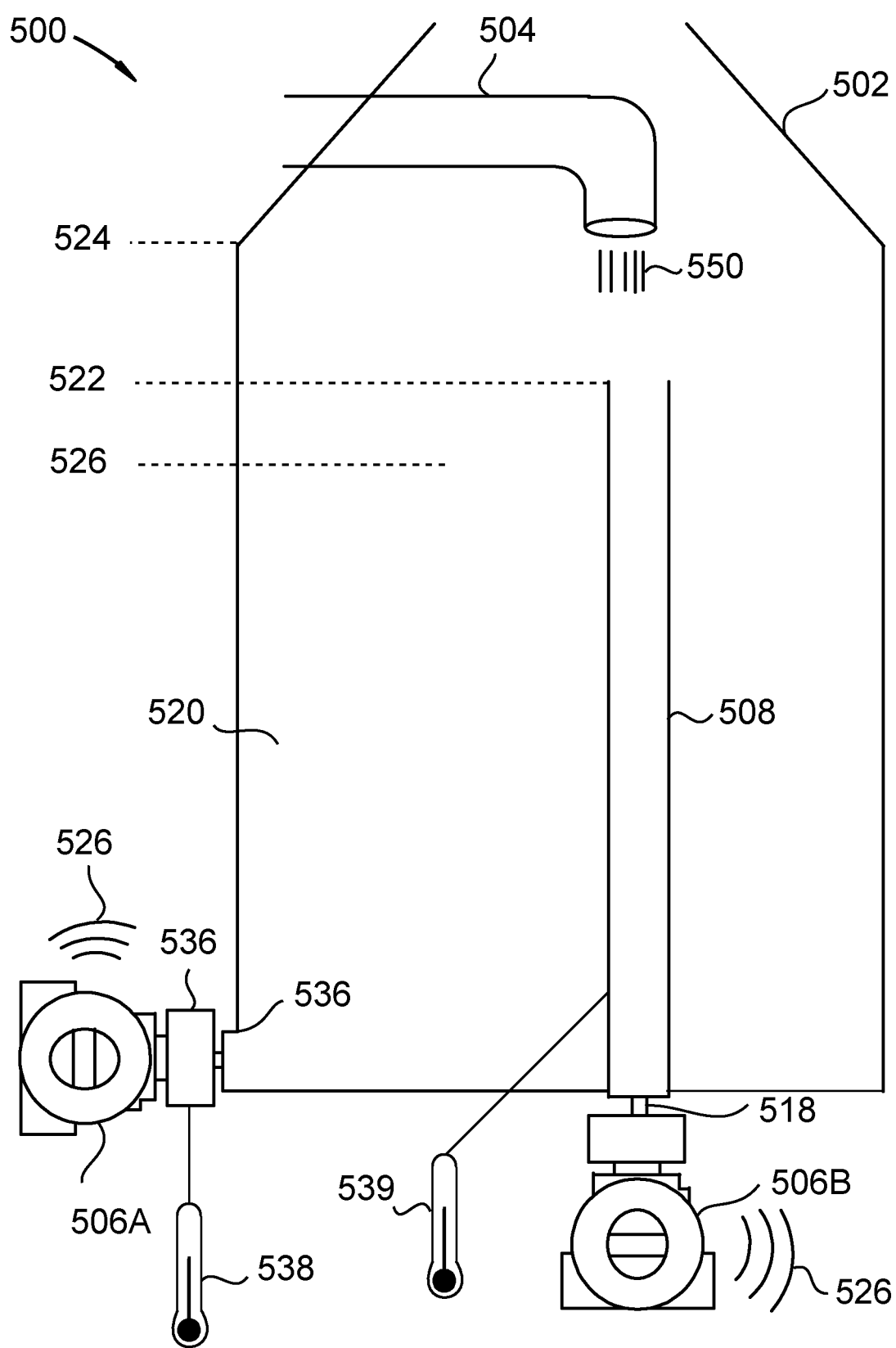
FIG. 5 is a cross-sectional elevation view of a vessel with a differential pressure transmitter.

FIG. 5 is a cross-sectional elevation view 500 of a vessel with a differential pressure transmitter that may be used in the devices, methods, and systems disclosed herein. Vessel 502 includes a cavity 520, an inlet pipe 504, a differential pressure transmitter (DPT) 506A and B, a reference tube inlet port 512, and an overflow outlet 540. DPT 506B includes an impulse port 518, an impulse tube 508, and a temperature transmitter 539. DPT 506A includes a reference port 516, a reference tube 510, a temperature transmitter 538, and a diaphragm 536. The fluid level 526 is below the maximum measurable level 522 at the top of the impulse tube ending. The vessel maximum desired fill level 524 is below the inlet pipe 504.

A process fluid 550 is passed into vessel 502 through inlet pipe 504. Impulse tube 508 is filled and the process fluid 550 overflows and fills vessel 502. The pressure difference between the reference tube 510 and the impulse tube 508 determines the fluid level 526. DPT 506A and B communicate wirelessly 526 to each other, to temperature transmitters 538 and 539, and to a receiver.

Figure 6:
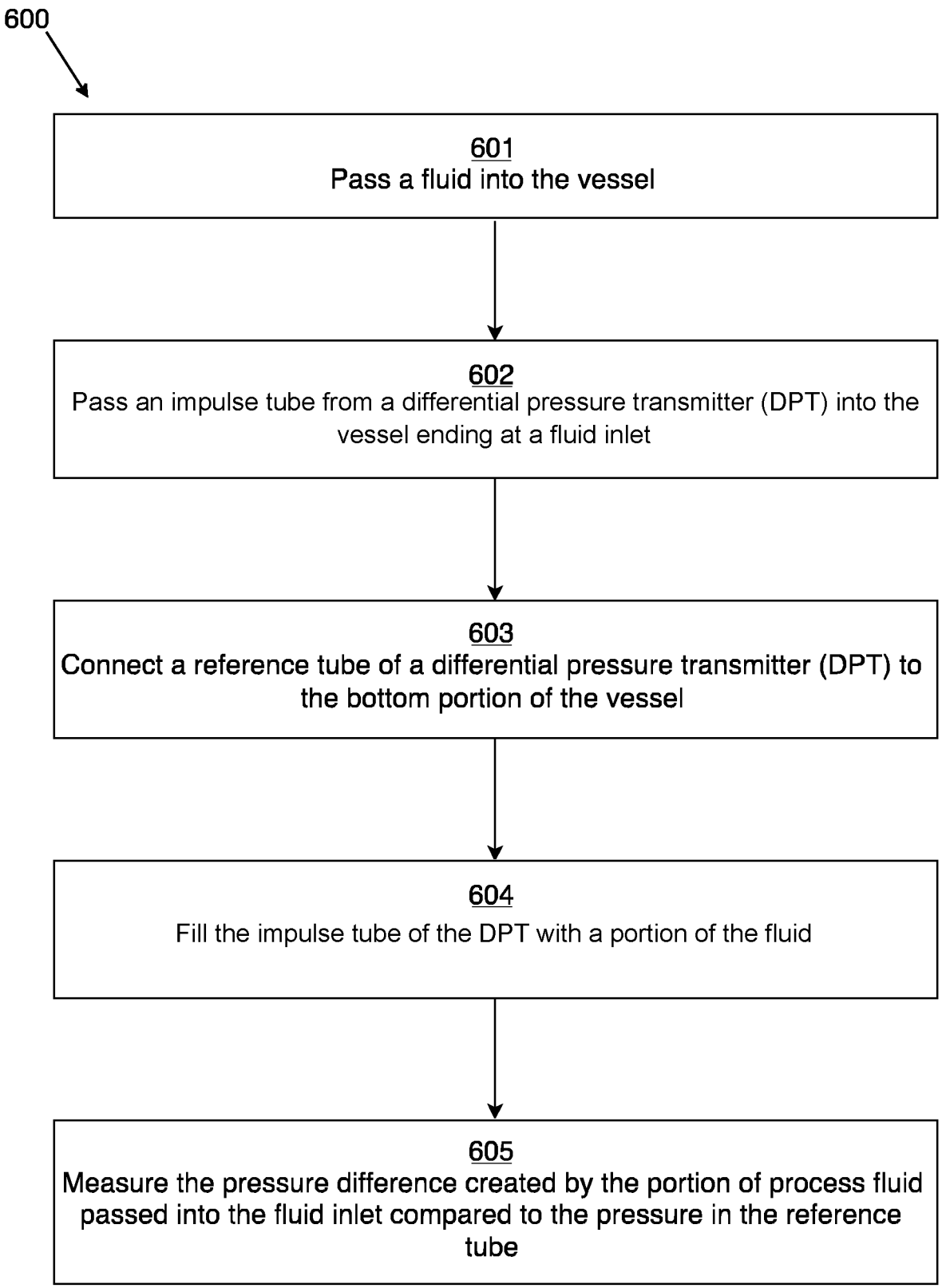
FIG. 6 is a method for measuring level in a vessel.

FIG. 6 is a method 600 for measuring level in a vessel that may be used in the devices, methods, and systems disclosed herein. At 601, a fluid is passed into a vessel. At 602, an impulse tube of a differential pressure transmitter (DPT) is filled with a portion of the fluid. At 603, a reference of the DPT connects to a bottom portion of the vessel. At 604, the impulse tube passes from the DPT into the vessel and ends at a fluid inlet. At 605, the pressure difference created by the portion of the process fluid that passes into the fluid inlet compared to the pressure of the reference tube is measured.

In one embodiment, the impulse tube ending may have a retractable cover. The retractable cover may have an open state and a closed state. The retractable cover may cover the fluid inlet in the closed state and may allow the process fluid to pass into the fluid inlet in the open state.

In some embodiments, the process fluid may be a cryogenic fluid, a supercritical fluid, or a combination thereof.

In some embodiments, the impulse tube may be filled with a reference fluid of the same density as a process fluid in the vessel.

In some embodiments, the reference tube to the vessel may be connected with a diaphragm and the reference tube may be filled with a reference fluid of a same density as a process fluid in the vessel.

All patents and published patent applications referred to herein are incorporated herein by reference. The invention has been described with reference to various specific and preferred embodiments and techniques. Nevertheless, it understood that many variations and modifications may be made while remaining within the spirit and scope of the invention.

What is claimed is:

1. An apparatus, comprising:
   a vessel comprising a cavity;
   a differential pressure sensor having a first port and a second port;
   a reference tube that connects the first port of the differential pressure sensor to a bottom portion of the cavity;
   an impulse tube that connects the second port of the differential pressure sensor to an impulse tube ending;
   wherein at least a portion of the impulse tube extends through the cavity and ends at a fluid inlet;
   wherein the fluid inlet is located at a level above the reference tube; and
   wherein the level is between the reference tube and a full height of the vessel.

2. The apparatus of claim 1, wherein the impulse tube ending comprises a fluid inlet, wherein the vessel includes a vessel inlet, the vessel inlet situated such that at least a portion of a process fluid entering the vessel passes into the fluid inlet of the impulse tube, filling the impulse tube with the process fluid.

3. The apparatus of claim 2, wherein the differential pressure sensor detects a pressure difference when the process fluid is added to the fluid inlet and wherein the pressure difference indicates a level of the process fluid in the vessel.

4. The apparatus of claim 2, further comprising a retractable cover, the retractable cover having an open state and a closed state, wherein the retractable cover covers the fluid inlet in the closed state and the retractable cover allows the process fluid to pass into the fluid inlet in the open state.

5. The apparatus of claim 4, wherein the process fluid comprises a cryogenic fluid, a supercritical fluid, or a combination thereof.

6. The apparatus of claim 4, wherein the fluid inlet comprises a funnel.

7. The apparatus of claim 4, wherein the impulse tube ending is closed and the impulse tube is filled with a reference fluid of the same density as a process fluid in the vessel.

8. The apparatus of claim 4, wherein the connection of the reference tube to the vessel comprises a diaphragm and the reference tube is filled with a reference fluid of a same density as a process fluid in the vessel.

9. The apparatus of claim 4, further comprising one or more temperature sensors, the one or more temperature sensors attached to the impulse tube, the reference tube, or a combination thereof.

10. The apparatus of claim 4, wherein the differential pressure sensor is at least partially enclosed within the vessel.

11. The apparatus of claim 4, wherein the differential pressure sensor further comprises a wireless communication apparatus.

12. The apparatus of claim 1, wherein the impulse tube comprises a hinged area allowing the impulse tube to be moved such that a process fluid entering the vessel does not pass into the fluid inlet.

13. A method for measuring level comprising:
   passing a process fluid into a vessel, a portion of the process fluid filling a fluid inlet of an impulse tube of a differential pressure sensor, wherein the differential pressure sensor further comprises a reference tube, the reference tube connecting the differential pressure sensor to a bottom portion of the vessel and the impulse tube passing from the differential pressure sensor into the vessel and ending at the fluid inlet; and
   measuring the pressure difference created by the portion of the process fluid that passes into the fluid inlet compared to a pressure of the reference tube; and
   wherein the fluid inlet comprises a funnel.

14. The method of claim 13, wherein the process fluid to be contained within the vessel comprises a cryogenic fluid, a supercritical fluid, or a combination thereof.

15. The method of claim 13, wherein the connection of the reference tube to the vessel comprises a diaphragm and the reference tube is filled with a reference liquid of a same density as a fluid in the vessel.

16. The method of claim 13, wherein the impulse tube and reference tube comprise one or more temperature sensors.

17. The method of claim 13, wherein the differential pressure sensor is at least partially enclosed within the vessel.

18. The method of claim 13, wherein the differential pressure sensor further comprises a wireless communication method.

* * * * *